(12) United States Patent
Smith

(10) Patent No.: US 11,871,873 B1
(45) Date of Patent: Jan. 16, 2024

(54) MANUAL FOOD SHREDDING DEVICE AND METHOD OF USE

(71) Applicant: Ronald Smith, Clackamas, OR (US)

(72) Inventor: Ronald Smith, Clackamas, OR (US)

( * ) Notice: Subject to any disclaimer, the term of this patent is extended or adjusted under 35 U.S.C. 154(b) by 0 days.

(21) Appl. No.: 17/896,014

(22) Filed: Aug. 25, 2022

(51) Int. Cl.
*A47J 42/34* (2006.01)

(52) U.S. Cl.
CPC ...................... *A47J 42/34* (2013.01)

(58) Field of Classification Search
CPC ............ A47J 42/34; A47J 42/38; A47J 42/46
See application file for complete search history.

(56) References Cited

U.S. PATENT DOCUMENTS

| | | | |
|---|---|---|---|
| 7,207,510 B2 | 4/2007 | Wong | |
| 7,762,487 B2 | 7/2010 | Cheung | |
| 8,733,679 B2 | 5/2014 | Camitta | |
| D739,689 S | 9/2015 | Metaxatos | |
| 9,770,134 B2 | 9/2017 | Unteregger | |
| 9,775,360 B2 | 10/2017 | Voyatzakis | |
| 2003/0001033 A1* | 1/2003 | Manson | B02C 13/22 241/188.2 |
| 2015/0290652 A1 | 10/2015 | Metaxatos | |
| 2018/0161780 A1 | 6/2018 | Mesa-Arias | |
| 2021/0030206 A1* | 2/2021 | Trzecieski | B02C 18/18 |
| 2021/0107111 A1* | 4/2021 | Kick | B24B 23/024 |
| 2022/0071448 A1* | 3/2022 | Hansen | A47J 42/24 |
| 2022/0265090 A1* | 8/2022 | Hall | A47J 42/42 |

FOREIGN PATENT DOCUMENTS

GB 1576490 10/1980

OTHER PUBLICATIONS

Manual Grinder, retrieved date Jun. 24, 2023. https://www.amazon.com/Manual-Grinder-DDSKY-Vintage-Antique/dp/B07RPVPQQ6.*

* cited by examiner

*Primary Examiner* — Matthew Katcoff
*Assistant Examiner* — Mohammed S. Alawadi

(57) ABSTRACT

A manual food shredding device for shredding of a food item includes a base, an upright bowl, and an inverted bowl. The base is positionable on a substantially horizontal surface, such as a countertop. A food item can be positioned in the upright bowl, which is attached to an upper face of the base. A plurality of first spikes is attached to and extends from a bottom toward a top of the upright bowl. The inverted bowl is circumferentially larger than the upright bowl so that the upright bowl is selectively insertable into the inverted bowl. A plurality of second spikes is attached to and extends from an upper end toward a lower end of the inverted bowl. The inverted bowl can be grasped in a hand of a user and rotated by a user, thereby causing the first spikes and the second spikes to shred the food item.

10 Claims, 6 Drawing Sheets

MANUAL FOOD SHREDDING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shredding devices and more particularly pertains to a new shredding device for shredding of a food item. The present invention discloses a shredding device that is easier to use and easier to clean after use.

(2) Description of Related Art Including Information Disclosed Under 37 CFR 1.97 and 1.98

The prior art relates to shredding devices, which may comprise laterally positioned shredding screws with hand cranks, one or more spinning shafts with attached blades, and vegetable shredders having opposed, rotatable, teethed plates. Additionally, the prior art includes shredding devices that including upper and lower pieces, which both are teethed. What is lacking in the prior art is a shredding device comprising an upright bowl, which is attached to a base, and an inverted bowl, which is positionable over the upright bowl so the spikes on the inverted bowl can be rotated concurrently with the inverted bowl relative to the upright bowl and spikes on the upright bowl.

BRIEF SUMMARY OF THE INVENTION

An embodiment of the disclosure meets the needs presented above by generally comprising a base, an upright bowl, and an inverted bowl. The base is configured to be positioned on a substantially horizontal surface, such as a countertop. The upright bowl is attached to an upper face of the base, proximate to a first end of the base, and is configured for positioning of a food item, such as cooked meat. A plurality of first spikes is attached to and extends from a bottom of the upright bowl toward a top of the upright bowl. The inverted bowl is circumferentially larger than the upright bowl so that the upright bowl is selectively insertable into the inverted bowl. A plurality of second spikes is attached to and extends from an upper end of the inverted bowl toward a lower end of the inverted bowl. The inverted bowl is configured to be grasped in a hand of a user, positioning the user to rotate the inverted bowl relative to the upright bowl, causing the first spikes and the second spikes to shred the food item.

Another embodiment of the invention comprises a method of shredding a food item, with a first step of the method being provision of a manual food shredding device. Subsequent steps of the method detail use of the manual food shredding device to shred a food item.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
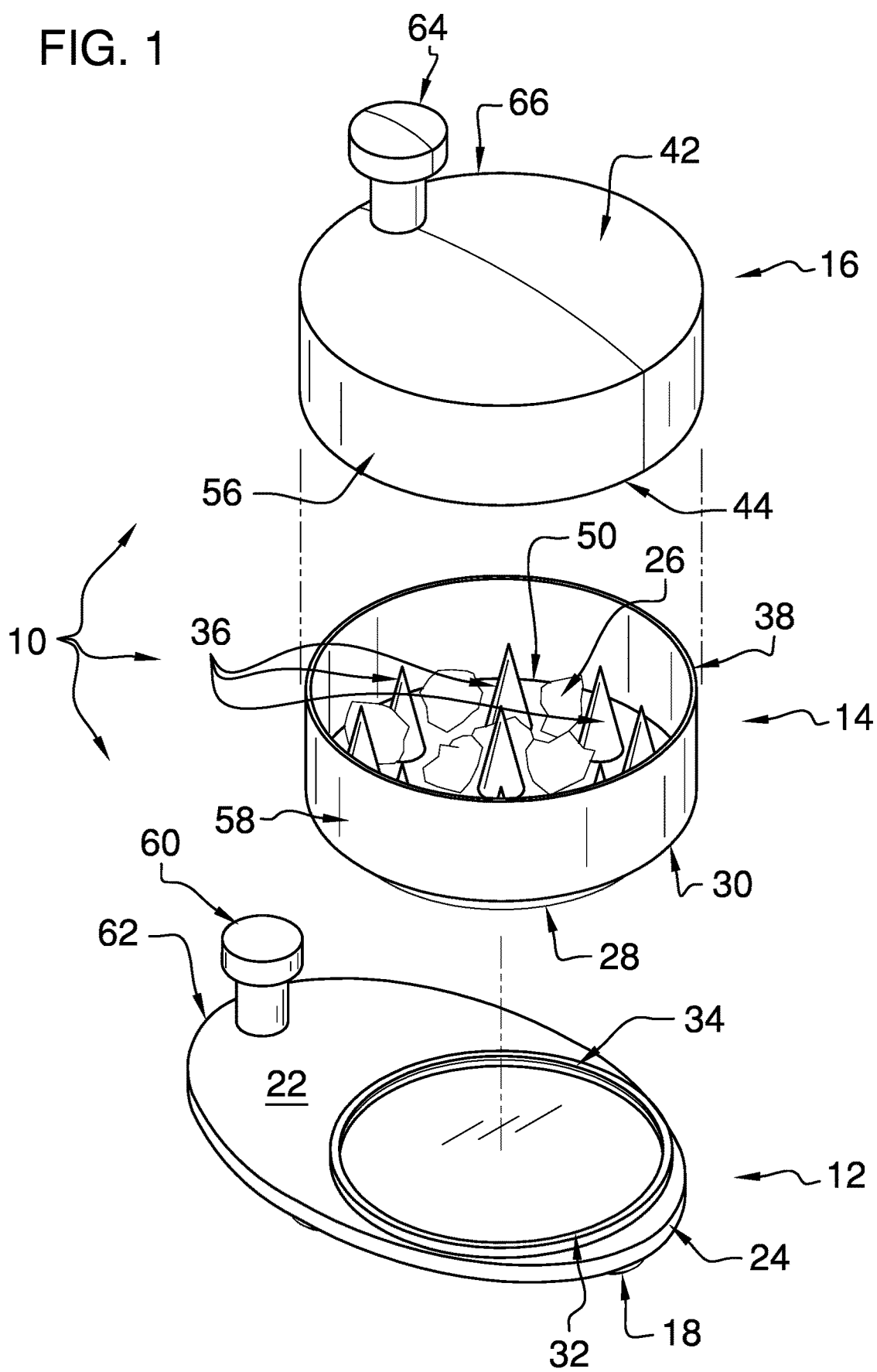
FIG. 1 is an exploded view of a manual food shredding device according to an embodiment of the disclosure.
Figure 2:
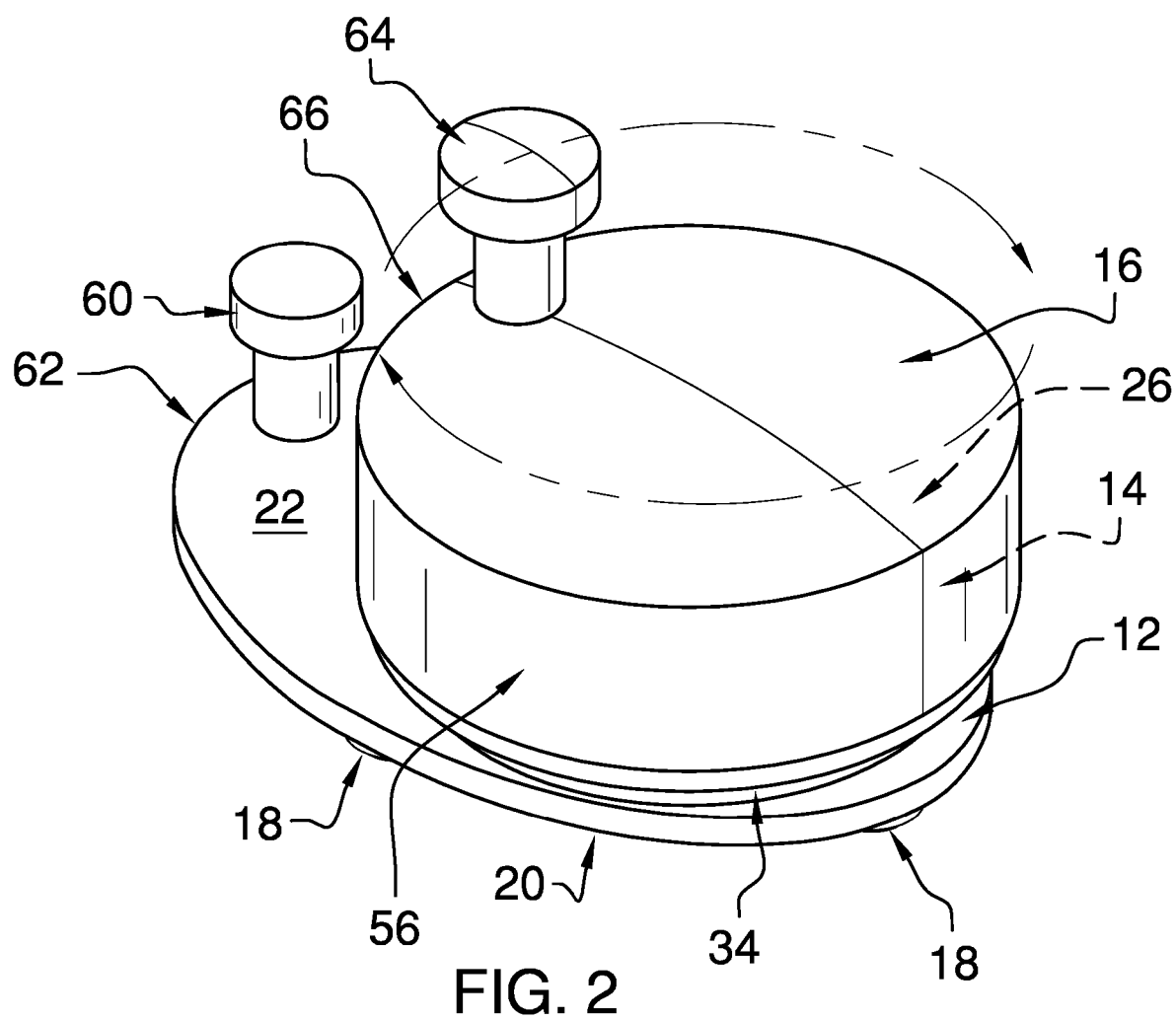
FIG. 2 is an isometric perspective view of an embodiment of the disclosure.

With reference now to the drawings, and in particular to FIGS. 1 through 6 thereof, a new shredding device embodying the principles and concepts of an embodiment of the disclosure and generally designated by the reference numeral 10 will be described.

Figure 3:
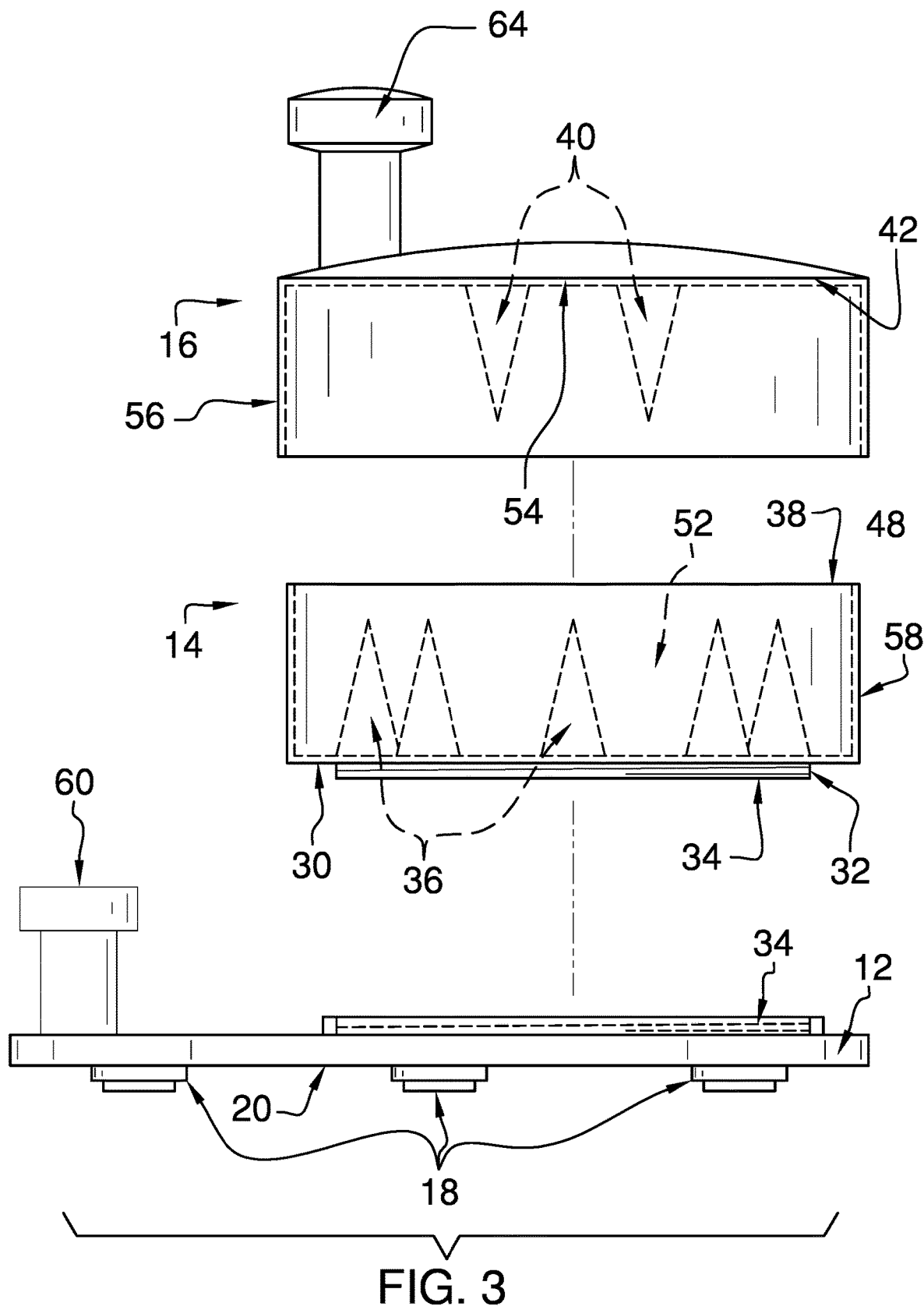
FIG. 3 is a front view of an embodiment of the disclosure.

As best illustrated in FIGS. 1 through 6, the manual food shredding device 10 generally comprises a base 12, an upright bowl 14, and an inverted bowl 16. The base 12 is configured to be positioned on a substantially horizontal surface, such as a countertop. A plurality of pads 18 is attached to a lower face 20 of the base 12, as shown in FIG. 3. The pads 18 comprise textured rubber, textured silicone, textured elastomer, or the like, and thus are configured to frictionally engage the substantially horizontal surface to prevent slippage of the base 12. The base 12 may be ovoid, as shown in FIG. 1, square, circular, or the like.

The upright bowl 14, which is attached to an upper face 22 of the base 12, proximate to a first end 24 of the base 12, is configured for positioning of a food item 26, such as cooked meat. A disc 28 is attached to a bottom 30 of the upright bowl 14. A perimeter 32 of the disc 28 is externally threaded. A ring 34, which is internally threaded, is attached to the upper face 22 of the base 12. The ring 34 is complementary to the disc 28 so that the disc 28 is selectively threadedly insertable into the ring 34 to removably attach the upright bowl 14 to the base 12. The upright bowl 14 being removably attached to the base 12 facilitates cleaning of the manual food shredding device 10 after use. The present invention also anticipates other attachment means for removably attaching the upright bowl 14 to the base 12, such as, but not limited to, magnets, suction cups, clamps, and the like. Additionally, the disc 28 could be attached to the base 12 and the ring 34 could be attached to the upright bowl 14.

A plurality of first spikes 36 is attached to and extends from the bottom 30 of the upright bowl 14 toward a top 38 of the upright bowl 14. The inverted bowl 16 is circumferentially larger than the upright bowl 14 so that the upright bowl 14 is selectively insertable into the inverted bowl 16. A plurality of second spikes 40 is attached to and extends from an upper end 42 of the inverted bowl 16 toward a lower end 44 of the inverted bowl 16. The first spikes 36 and the second spikes 40 are multifaceted pyramid shaped so that each first spike 36 comprises a plurality of first cutting edges 46 and each second spike 40 comprises a plurality of second cutting edges 48. The present invention anticipates the first spikes 36 and the second spikes 40 being of alternative shapes.

Figure 4:
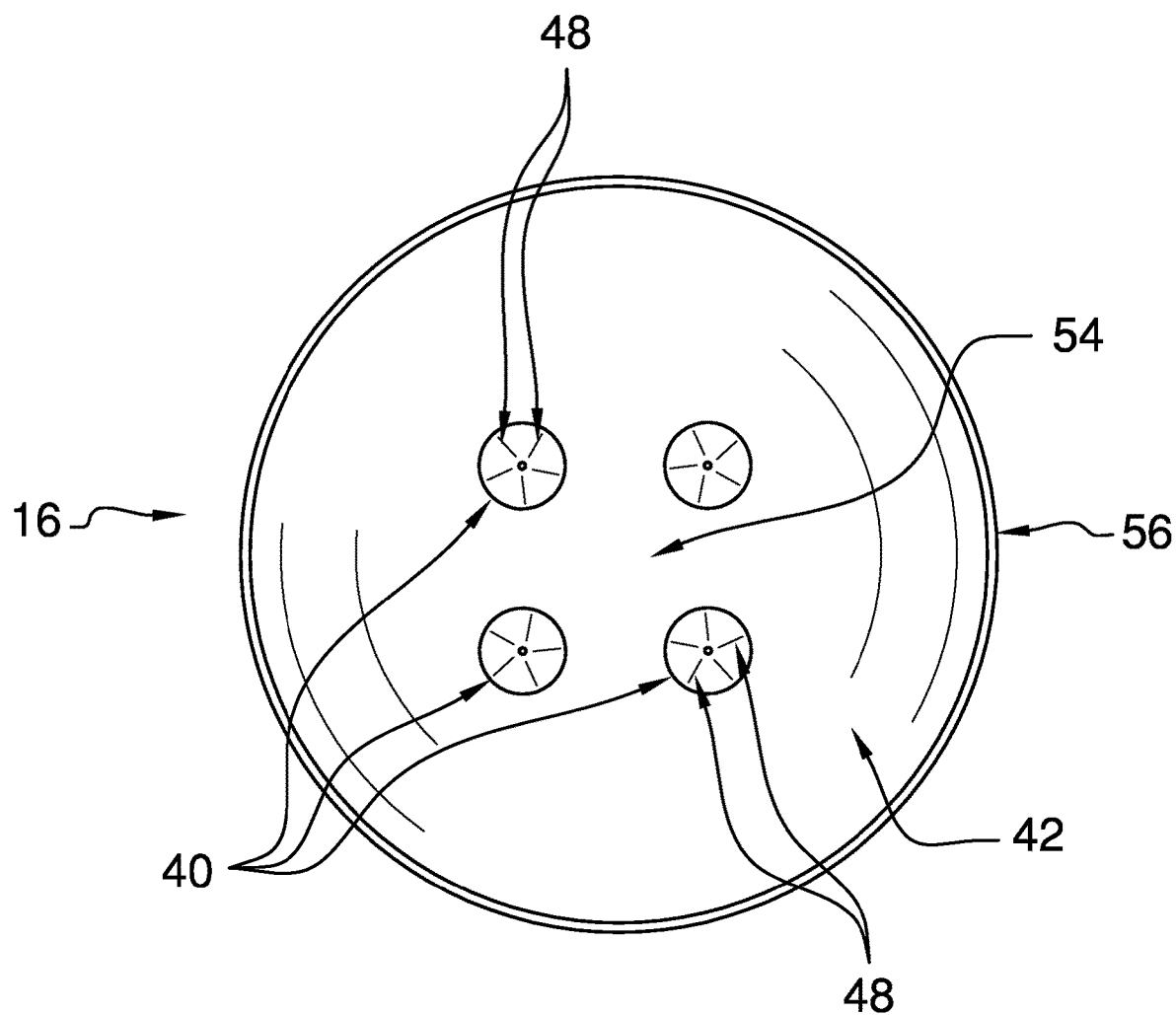
FIG. 4 is a bottom view of an embodiment of the disclosure.
Figure 5:
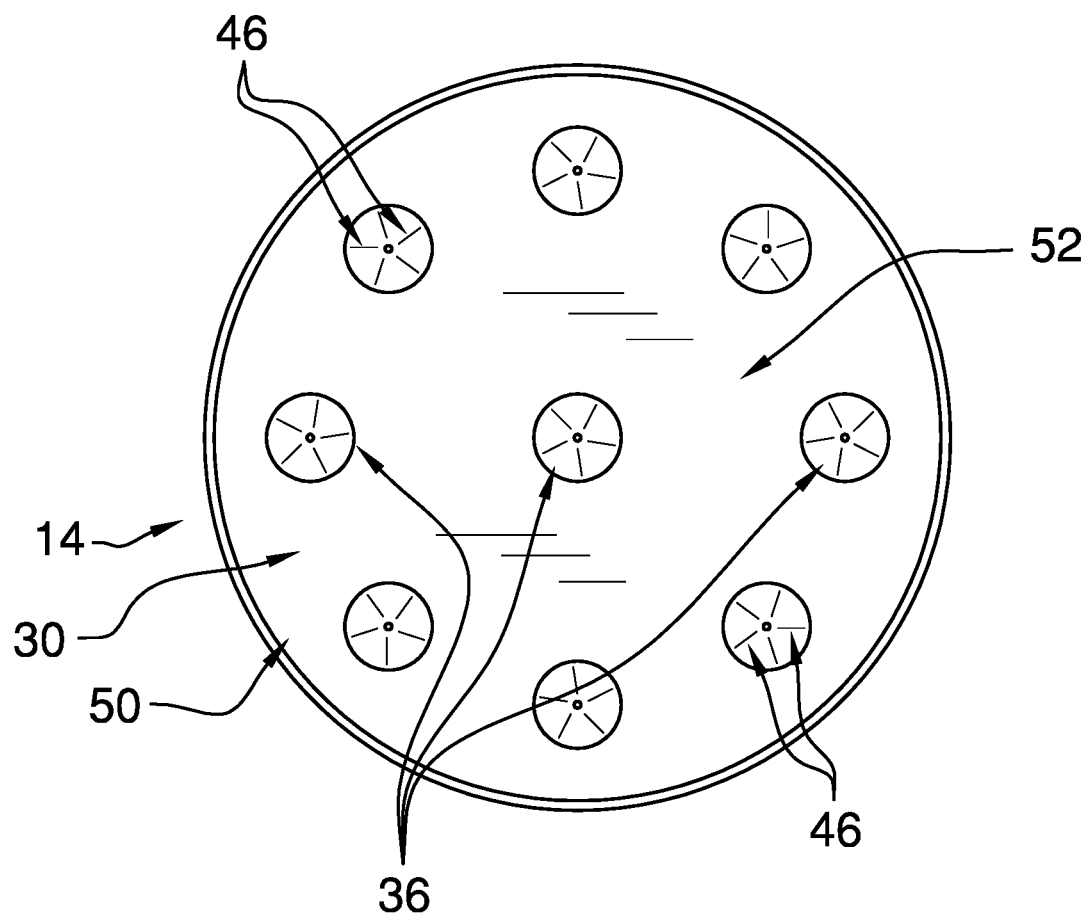
FIG. 5 is a top view of an embodiment of the disclosure.
Figure 6:
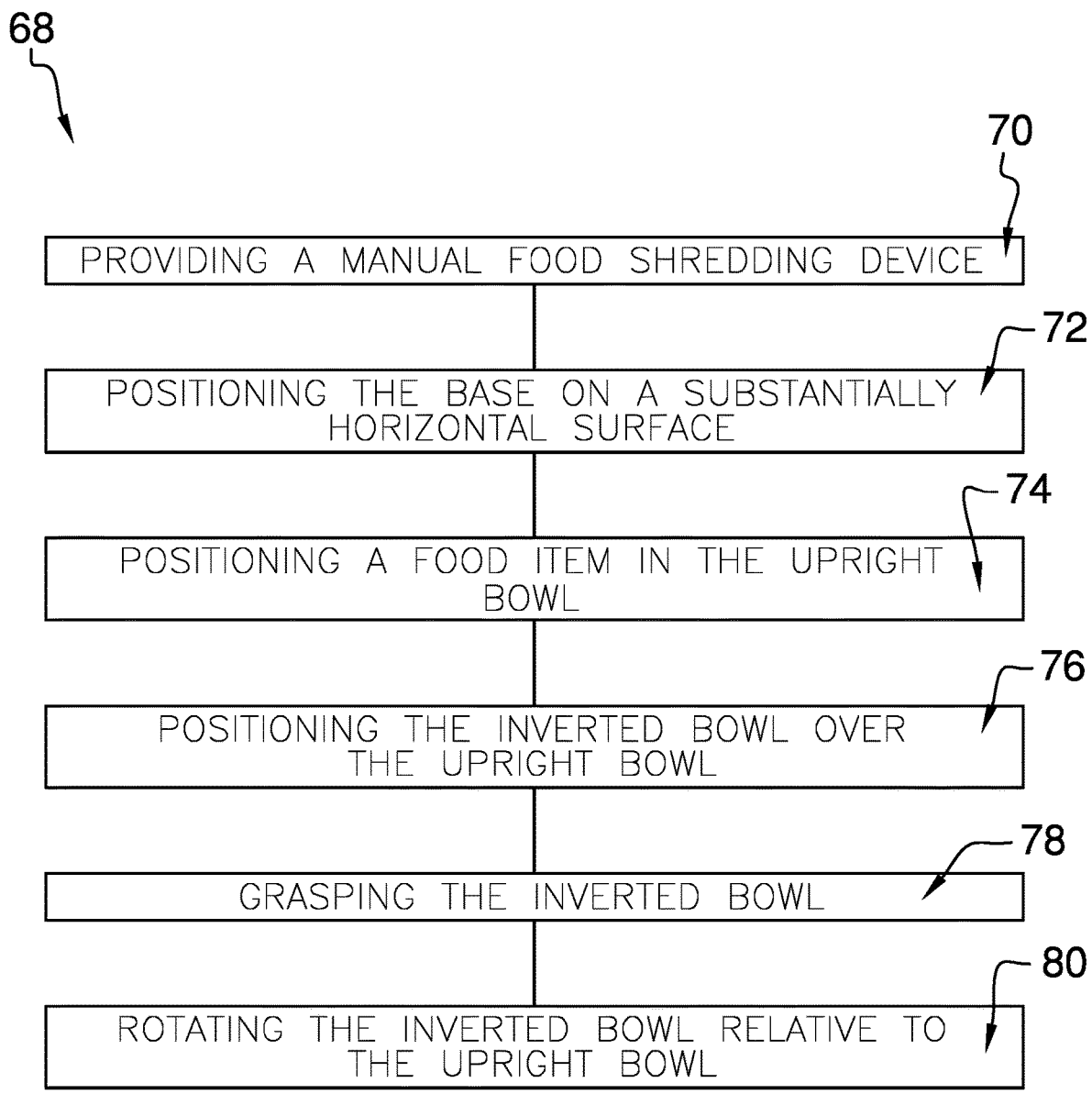
FIG. 6 is a flow diagram for a method utilizing an embodiment of the disclosure.

The plurality of first spikes 36 comprises one first spike 36, which extends axially from the bottom 30, as shown in FIG. 5. The plurality of first spikes 36 also comprises first spikes 36 that extend circumferentially around a circumference 50 of the bottom 30 so that the plurality of first spikes 36 defines a channel 52. The plurality of second spikes 40 is circularly arrayed around a center 54 of the inverted bowl 16, as shown in FIG. 4, so that the second spikes 40 extend into the channel 52 upon positioning of the inverted bowl 16 on the upright bowl 14. The present invention anticipates alternative configurations for the first spikes 36 and second spikes 40 that would achieve the purpose of the invention, such as, but not limited to, an inversion of the configuration shown in FIGS. 4 and 5, configurations of first spikes 36 that define two or more channels 52, and the like.

The inverted bowl 16 is sized such that the upper end 42 of the inverted bowl 16 rests upon the top 38 of the upright bowl 14 and such that a sidewall 56 of the inverted bowl 16 is adjacent to a sidewall 58 of the upright bowl 14. The inverted bowl 16 is configured to be grasped in a hand of a user, positioning the user to rotate the inverted bowl 16 relative to the upright bowl 14, causing the first spikes 36 and the second spikes 40 to shred the food item 26.

The manual food shredding device 10 also may comprise a first handle 60, which is fixedly attached to the base 12 proximate to a second end 62 of the base 12, and a second handle 64, which is rotationally attached to the upper end 42 proximate to an outer circumference 66 of the inverted bowl 16. The first handle 60 and the second handle 64 are configured to be grasped in first and second hands of the user, respectively, positioning the user to stabilize the base 12 and to rotate the inverted bowl 16 relative to the upright bowl 14 to shred the food item 26. The second handle 64 being rotatably attached to the inverted bowl 16 facilitates rotation of the inverted bowl 16.

In use, the manual food shredding device 10 enables a method of shredding a food item 68. The method 68 comprises a first step 70 of providing a manual food shredding device 10 according to the specification above. A second step 72 of the method 68 is positioning the base 12 on a substantially horizontal surface. A third step 74 of the method 68 is positioning a food item 26 in the upright bowl 14. A fourth step 76 of the method 68 is positioning the upright bowl 14 over the inverted bowl 16. A fifth step 78 of the method 68 is grasping the inverted bowl 16. A sixth step 80 of the method 68 is rotating the inverted bowl 16 relative to the upright bowl 14 so that the first spikes 36 and the second spikes 40 shred the food item 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A manual food shredding device comprising:
   a base configured for positioning on a horizontal surface;
   an upright bowl attached to an upper face of the base proximate to a first end of the base, wherein the upright bowl is configured for positioning of a food item;
   a plurality of first spikes attached to and extending from a bottom of the upright bowl toward a top of the upright bowl;
   an inverted bowl circumferentially larger than the upright bowl, such that the upright bowl is selectively insertable into the inverted bowl;
   a plurality of second spikes attached to and extending from an upper end of the inverted bowl toward a lower end of the inverted bowl, wherein the inverted bowl is configured for grasping in a hand of a user, positioning the user for rotating the inverted bowl relative to the upright bowl, such that the first spikes and the second spikes shred the food item;
   a first handle fixedly attached to the base proximate to a second end of the base; and
   a second handle rotationally attached to the upper end proximate to an outer circumference of the inverted bowl, wherein the first handle and the second handle are configured for grasping in first and second hands of a user, respectively, positioning the user for stabilizing the base and for rotating the inverted bowl relative to the upright bowl for shredding the food item.

2. The manual food shredding device of claim 1, further including a plurality of pads attached to a lower face of the base, the pads comprising textured rubber, textured silicone, or textured elastomer, wherein the pads are configured for frictionally engaging the horizontal surface.

3. The manual food shredding device of claim 1, wherein the base is ovoid.

4. The manual food shredding device of claim 1, further including:
- a disc attached to the bottom of the upright bowl, a perimeter of the disc being externally threaded; and
- a ring attached to the upper face of the base, the ring being internally threaded, such that the ring is complementary to the disc and such that the disc is selectively threadedly insertable into the ring for removably attaching the upright bowl to the base.

5. The manual food shredding device of claim 1, wherein the inverted bowl is sized such that the upper end of the inverted bowl rests upon the top of the upright bowl.

6. The manual food shredding device of claim 1, wherein the inverted bowl is sized such that a sidewall of the inverted bowl is adjacent to a sidewall of the upright bowl.

7. The manual food shredding device of claim 1, wherein:
- the first spikes are multifaceted pyramid shaped, such that each first spike comprises a plurality of first cutting edges; and
- the second spikes are multifaceted pyramid shaped, such that each second spike comprises a plurality of second cutting edges.

8. The manual food shredding device of claim 1, wherein:
- the plurality of first spikes comprises one first spike extending axially from the bottom and first spikes extending circumferentially around a circumference of the bottom, such that the plurality of first spikes defines a channel; and
- the plurality of second spikes is circularly arrayed around a center of the inverted bowl, such that the second spikes extend into the channel upon positioning of the inverted bowl on the upright bowl.

9. A method of shredding a food item comprising the steps of:
- providing a manual food shredding device comprising:
  - a base,
  - an upright bowl attached to an upper face of the base proximate to a first end of the base,
  - a plurality of first spikes attached to and extending from a bottom of the upright bowl toward a top of the upright bowl,
  - an inverted bowl circumferentially larger than the upright bowl, such that the upright bowl is selectively insertable into the inverted bowl,
  - a plurality of second spikes attached to and extending from an upper end of the inverted bowl toward a lower end of the inverted bowl,
  - a first handle fixedly attached to the base proximate to a second end of the base, and
  - a second handle rotationally attached to the upper end proximate to an outer circumference of the inverted bowl, wherein the first handle and the second handle are configured for grasping in first and second hands of a user, respectively, positioning the user for stabilizing the base and for rotating the inverted bowl relative to the upright bowl for shredding the food item;
- positioning the base on a horizontal surface;
- positioning a food item in the upright bowl;
- positioning the inverted bowl over the upright bowl;
- grasping the inverted bowl; and
- rotating the inverted bowl relative to the upright bowl, such that the first spikes and the second spikes shred the food item.

10. A manual food shredding device comprising:
- a base configured for positioning on a horizontal surface;
- a plurality of pads attached to a lower face of the base, the pads comprising textured rubber, textured silicone, or textured elastomer, wherein the pads are configured for frictionally engaging the horizontal surface, the base being ovoid;
- an upright bowl attached to an upper face of the base proximate to a first end of the base, wherein the upright bowl is configured for positioning of a food item;
- a plurality of first spikes attached to and extending from a bottom of the upright bowl toward a top of the upright bowl, the first spikes being multifaceted pyramid shaped, such that each first spike comprises a plurality of first cutting edges, the plurality of first spikes comprising one first spike extending axially from the bottom and first spikes extending circumferentially around a circumference of the bottom, such that the plurality of first spikes defines a channel;
- a disc attached to the bottom of the upright bowl, a perimeter of the disc being externally threaded;
- a ring attached to the upper face of the base, the ring being internally threaded, such that the ring is complementary to the disc and such that the disc is selectively threadedly insertable into the ring for removably attaching the upright bowl to the base;
- an inverted bowl circumferentially larger than the upright bowl, such that the upright bowl is selectively insertable into the inverted bowl, the inverted bowl being sized such that an upper end of the inverted bowl rests upon the top of the upright bowl and such that a sidewall of the inverted bowl is adjacent to a sidewall of the upright bowl;
- a plurality of second spikes attached to and extending from the upper end of the inverted bowl toward a lower end of the inverted bowl, wherein the inverted bowl is configured for grasping in a hand of a user, positioning the user for rotating the inverted bowl relative to the upright bowl, such that the first spikes and the second spikes shred the food item, the second spikes being multifaceted pyramid shaped, such that each second spike comprises a plurality of second cutting edges, the plurality of second spikes being circularly arrayed around a center of the inverted bowl, such that the second spikes extend into the channel upon positioning of the inverted bowl on the upright bowl;
- a first handle fixedly attached to the base proximate to a second end of the base; and
- a second handle rotationally attached to the upper end proximate to an outer circumference of the inverted bowl, wherein the first handle and the second handle are configured for grasping in first and second hands of a user, respectively, positioning the user for stabilizing the base and for rotating the inverted bowl relative to the upright bowl for shredding the food item.

* * * * *